United States Patent
Marshall et al.

(10) Patent No.: US 6,328,921 B1
(45) Date of Patent: Dec. 11, 2001

(54) DE-MOLDING METHOD AND APPARATUS FOR A GOLF BALL

(75) Inventors: Gary G. Marshall, Soddy Daisy, TN (US); Alan C. Bettencourt, Solana Beach; Donn A. Wilber, Escondido, both of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,879

(22) Filed: Feb. 1, 2000

(51) Int. Cl.$^7$ .................................................. B29C 45/14
(52) U.S. Cl. ...................... 264/279.1; 264/71; 264/248; 264/250; 264/275; 264/334; 249/661.1; 249/74; 249/76; 425/116; 425/441; 425/443
(58) Field of Search ................. 264/250, 279.1, 264/511, 71, 279, 334, 248, 275; 249/66.1, 74, 76; 425/116, 441, 443

(56) References Cited

U.S. PATENT DOCUMENTS

| | | |
|---|---|---|
| 721,462 | 2/1903 | Richards . |
| 2,940,128 | 6/1960 | Howerman et al. . |
| 3,034,791 | 5/1962 | Gallagher . |
| 3,068,522 | 12/1962 | Nickerson et al. . |
| 3,112,521 | 12/1963 | Ward . |
| 3,130,102 | 4/1964 | Watson et al. . |
| 3,147,324 | 9/1964 | Ward . |
| 3,177,280 | 4/1965 | Ford et al. . |
| 3,584,470 * | 6/1971 | Zearfoss, Jr. ............... 62/353 |
| 3,616,101 | 10/1971 | Satchell et al. . |
| 3,979,126 | 9/1976 | Dusbiber . |
| 3,989,568 | 11/1976 | Isaac . |
| 4,123,061 | 10/1978 | Dusbiber . |
| 4,203,941 | 5/1980 | Brooker . |
| 4,541,795 * | 9/1985 | Cole ........................ 425/437 |
| 4,959,000 | 9/1990 | Giza . |
| 5,006,288 | 4/1991 | Rhodes, Jr. et al. . |
| 5,006,297 | 4/1991 | Brown et al. . |
| 5,112,556 | 5/1992 | Miller . |
| 5,194,191 | 3/1993 | Nomura et al. . |
| 5,334,673 | 8/1994 | Wu . |
| 5,484,870 | 1/1996 | Wu . |
| 5,692,974 | 12/1997 | Wu et al. . |
| 5,703,193 | 12/1997 | Rosenberg et al. . |
| 5,733,428 | 3/1998 | Calabria et al. . |
| 5,885,172 | 3/1999 | Hebert et al. . |
| 5,888,437 | 3/1999 | Calabria et al. . |
| 5,897,884 | 4/1999 | Calabria et al. . |
| 5,908,358 | 6/1999 | Wu . |
| 5,947,843 | 9/1999 | Calabria et al. . |

FOREIGN PATENT DOCUMENTS

WO 99/43394  2/1999  (WO) .

* cited by examiner

*Primary Examiner*—Jan H. Silbaugh
*Assistant Examiner*—Edmund H. Lee
(74) *Attorney, Agent, or Firm*—Michael A. Catania

(57) ABSTRACT

A method and system for de-molding golf balls having a casted layer is disclosed herein. The invention includes exerting a first lateral force against a top mold half of a mold assembly and exerting a second lateral force against a bottom mold half of the mold assembly to separate the mold assembly and de-mold the golf balls from the top mold half. Preferably, the mold assembly is used to form a thermoset polyurethane cover over a core and boundary layer. The bottom mold half may have a double tapered pin, or a retractable pin with a single taper. The method and system allow for hot de-molding of golf balls from the mold assembly.

20 Claims, 13 Drawing Sheets

DE-MOLDING METHOD AND APPARATUS FOR A GOLF BALL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to an apparatus and method for de-molding a golf ball from a mold cavity. More specifically, the present invention relates to an apparatus and method for de-molding a golf ball from a mold cavity subsequent to forming a thermoset polyurethane cover on the golf ball.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

Golf balls are typically manufactured by various molding processes, whether one-component or multicomponent balls. Generally, the core of the golf ball is formed by casting, compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, and/or injection molding.

One of the earliest disclosures of manufacturing a golf ball with dimples is set forth in U.S. Pat. No. 721,462 to Richards, which was filed on May 26, 1902. Richards discloses covering a core that is centered with pins within a spherical cavity of a mold, with a fluent gutta percha material. The gutta percha material is subjected to high pressure and then cooled within the mold to form a cover on the core.

Bowerman et al., U.S. Pat. No. 2,940,128, which was filed on May 14, 1958, discloses a method of manufacturing a rubber covered golf ball. Bowerman discloses separately forming rubber hemispherical covers on the core.

One of the earliest methods of manufacturing a polyurethane cover is disclosed in Gallagher, U.S. Pat. No. 3,034,791, which was filed on Apr. 26, 1960. Gallagher discloses forming polyurethane disks that were then molded over cores to create a polyurethane cover.

Another early method of manufacturing a polyurethane cover is disclosed in Ward, U.S. Pat. No. 3,147,324, which was filed on Oct. 20, 1960. Ward discloses using a liquid polyurethane prepolymer, either polyether-type or polyester-type, that is cured with a diamine. The liquid polyurethane is poured into a hemispherical mold cavity of a mold half, and a wound golf ball core is centered therein. Subsequently, a corresponding hemispherical mold cavity of a second mold half is filled with the liquid polyurethane. The first mold half with the wound core is then mated with the second mold half and allowed to cure for a set period of time.

A second Ward patent directed toward forming a polyurethane cover is U.S. Pat. No. 3,112,521, which was filed on Mar. 8, 1961. The '521 Ward patent discloses a method and apparatus for sensing the center of a wound core prior to placement in a mold filled with liquid polyurethane which is part of a complete casting machine. As with the '324 Ward patent, liquid polyurethane is poured into a hemispherical mold cavity of a mold half. However, in the '521 Ward patent, the wound core is more precisely centered prior to insertion into the polyurethane filled cavity. The entire process of the '521 Ward patent is performed on a rotatable annular platform.

Another example of a method for making a polyurethane cover is disclosed in Watson et al., U.S. Pat. No. 3,130,102, filed originally in Great Britain on May 19, 1960. Watson discloses a process for partially forming polyurethane half-shells for a golf ball, cooling them, then fusing them together on a core while imparting a dimple pattern thereon. Watson also demonstrates better cutting resistance for its polyurethane covered golf ball. An alternative of the Watson process for making a polyurethane cover on a golf ball is disclosed in a related patent to Ford et al., U.S. Pat. No. 3,177,280, filed originally in Great Britain on May 23, 1960. Ford discloses coating a core until the required thickness is applied, however, it still requires interrupting the curing, to place the coated core into a mold to impart a dimple pattern thereon.

Building upon Ford and Watson, U.S. Pat. No. 3,989,568 to Isaac discloses a process for using curing agents that have different reaction rates to partially cure a polyurethane half shell that is later placed on a core for further processing. Isaac discloses that a cover may be as thin as 0.025 inches using this process which involves two different diisocyanates and different amine curing agents. Dusbiber, U.S. Pat. No. 3,979,126, originally filed in February of 1965, discloses another method of making polyurethane half shells for a golf ball cover.

Brown et al., U.S. Pat. No. 5,006,297, filed on Feb. 22, 1989, discloses openly curing both halves of polyurethane cover in an initial mold, then compression molding the smooth covered golf ball to form a dimple pattern thereon. The initial molding step may use retractable or non-retractable pins to center the wound core while polyurethane flows about it.

Wu, U.S. Pat. No. 5,334,673 discloses the multiple step process of Ford and Watson using a slow-reacting polyamine curing agent. Wu et al., U.S. Pat. No. 5,692,974 discloses the difficulty in manufacturing a commercially viable polyurethane covered golf ball due to the centering of the core within a partially cured mixture of polyurethane. The '974 Wu patent states that the 1993 Titleist PROFESSIONAL was the first successful polyurethane covered golf ball.

Calabria et al., U.S. Pat. Nos. 5,733,428; 5,888,437; 5,897,884; and 5,947,843 all originate from an application filed on Jan. 21, 1994 which was a continuation-in-part application of an abandoned application filed on Jul. 6, 1992. The Calabria family of patents disclose a method and apparatus for forming a wound core golf ball with a polyurethane cover. The apparatus of Calabria, similar to that of the '521 Ward patent, inserts a wound core into a half mold cavity of partially cured polyurethane. Calabria discloses using a single insertion device for each individual mold. Calabria introduces the polyurethane mixture into a top mold half and after 50 to 80 seconds later a core is lowered at a controlled rate to prevent air bubbles, and a stop limits the downward movement of the core into the mold cavity. At a later time the bottom mold halves are filled with the polyurethane mixture. After another 50 to 80 seconds, the vacuum holding the core is released and mold halves are removed from the centering fixture. The top mold halves are then mated with the bottom mold halves and excess material resides in sprue channels. The mold halves are heated and pressurized for a predetermined period of time, and then demolded.

Herbert et al., U.S. Pat. No. 5,885,172, which was filed on May 27, 1997, discloses using the process of Calabria to form a polyurethane cover over a core with an inner layer thereon. Wu, U.S. Pat. No. 5,908,358, which was originally filed on Jun. 7, 1995, discloses using a four mold unit to manufacture golf balls with polyurethane covers.

Dewanjee, et al., PCT International Publication Number WO 99/43394, claiming priority from U.S. patent application Ser. No. 09/030,332, filed on Feb. 25, 1998 discloses a method for forming a polyurethane cover on a golf ball. Dewanjee discloses using a X-Y table to position mold halves under a mix head that dispenses the polyurethane mixture. The mold halves are then placed on a conveyor for transport to a core insertion station. The cores are then centered over each cavity through use of a pin on the mold half that engages with an aperture on the core holding unit. A second mold half is mated with the first mold half, and the mold is heated under pressure to form a polyurethane cover over the core. De-molding is accomplished through insertion of mold releasing pins into apertures of the mold halves. Alternatively, the mold is cooled to allow for the thermoset layer to shrink in order to release the golf balls from the mold cavities. The cooling of the mold adds to the production time.

Consequently, there remains a need for methods of manufacturing golf balls that do not suffer from the above disadvantages. Moreover, the methods would preferably decrease the cycle time between production runs.

BRIEF SUMMARY OF THE INVENTION

The present invention provides a method and system that resolves the problems of the prior art. The present invention provides a method and system that allows for hot de-molding of thermoset covered golf balls from a mold assembly thereby increasing production times.

One aspect of the present invention is a method for de-molding a golf ball from a casting mold. The method includes placing a thermoset layer over a golf ball precursor product within a mold cavity of a mold assembly. The mold assembly is divisible into first and second mold halves. The next step is curing the thermoset layer within the mold cavity to form a golf ball with a cured thermoset layer. The next step is separating the mold assembly by exerting a first lateral force on the first mold half in a first direction, and exerting a second lateral force on the second mold half in a second direction opposite the first direction.

The method may also include retracting a retractable pin of the second mold half to a demolding position prior to separating the mold assembly. The retractable pin has a tapered top portion engaging the first mold half in the de-molding position. The method my also include sliding the first mold half over the tapered top portion of the retractable pin during separation of the mold assembly. The method may also include disengaging the mold assembly locking mechanism prior to separating the mold assembly. The method may also include exerting a third lateral force on the first mold half in a third direction opposite the first direction, the first lateral force being greater than the third lateral force, and exerting a fourth lateral force on the second mold half in a fourth direction opposite the second direction, the second lateral force being greater than the fourth lateral force. The method may also include rolling the golf ball from a hemispherical cavity of the first mold half during separating the mold assembly.

Another aspect of the present invention is a system for de-molding a plurality of golf ball precursor products after casting a thermoset layer on each. The system includes a mold assembly, a separation mechanism and a conveyor. The mold assembly includes a first mold half and a second mold half. Each of the first and second mold halves has a plurality of cavities. The second mold cavity has at least one retractable pin with a tapered top portion. The retractable pin is adjustable between a molding position and a de-molding position. The mold assembly separation mechanism is capable of exerting a first lateral force on the first mold half in a first direction, and a second lateral force on the second mold half in a second direction opposite the first direction. The conveyor transfers the mold assembly to the mold assembly separation mechanism. The first mold half slides over the retractable pin in the de-molding position when the mold assembly separation mechanism exerts the first and second lateral forces against the first and second mold halves respectively.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1–5, a mold assembly for casting a layer of a thermoset material on a golf ball precursor product is generally designated 20, and is composed of a first mold half 22a and a second mold half 22b. In a preferred embodiment, the first mold half 22a is the top mold half and the second mold half 22b is the bottom mold half The mold halves 22a–b are mated together during a casting process as set forth in co-pending U.S. patent application Ser. No. 09/ filed on an even date herewith, entitled System And Method For Cast Molding A Golf Ball, which is hereby incorporated in its entirety by reference.

Figure 1:
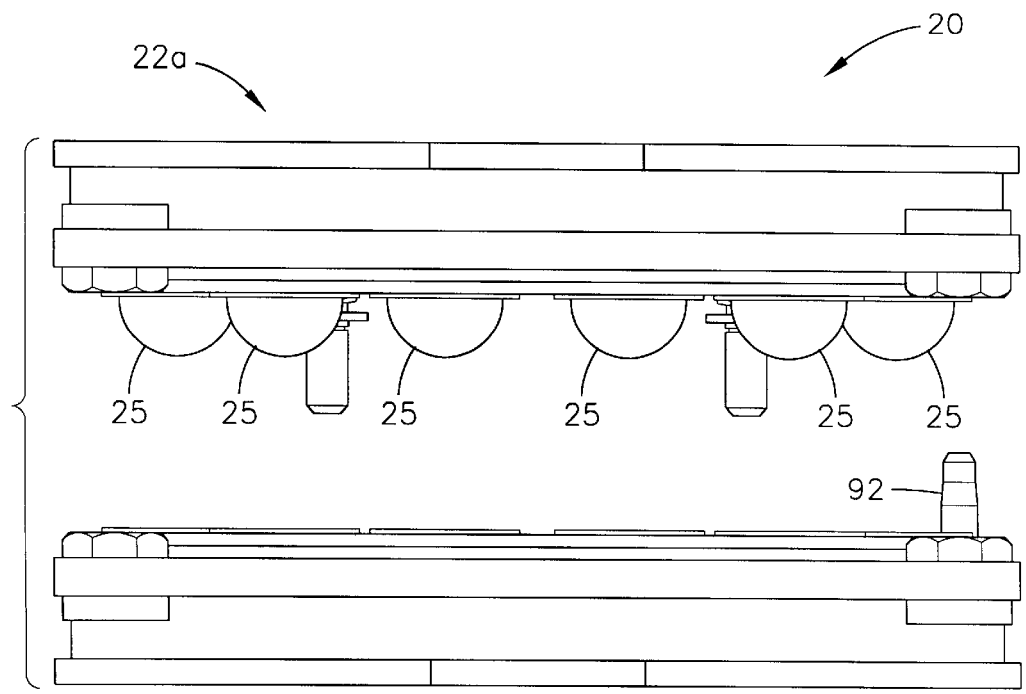
FIG. 1 is a side view of a mold assembly of the present invention.
Figure 1A:
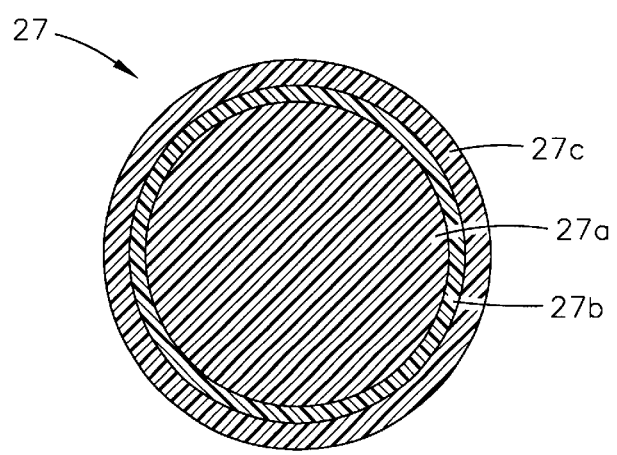
FIG. 1A is a cross-sectional view of a golf ball that may be manufactured using the present invention.

As shown in FIG. 1, a set of golf ball precursor products 25 are placed within the first mold half 22a which is inverted for mating with the second mold half 22b. The golf ball precursor products 25 may be a core (solid, liquid or hollow) that is wound or non-wound. Each golf ball precursor product 25 may also have one or more intermediate or boundary layers over the core portion. The thermoset material layer that is casted in the mold assembly 20 is preferably the cover layer 27c of the golf ball 27, however, it may also be the boundary layer 27b. A preferred thermoset material is polyurethane such as described in co-pending U.S. patent application Ser. No. 09/295,635, entitled Polyurethane Cover For A Golf Ball, which pertinent parts are hereby incorporated by reference. However, those skilled in the relevant art will recognize that other thermoset materials may be used with the mold assembly 20 without departing from the scope and spirit of the present invention.

Referring again to FIGS. 1–5, each mold half 22a–b is generally composed of a carrier base 24, a carrier plate 26 and a retainer plate 28. Each mold half 22a–b also has a plurality of mold inserts 30 positioned within mold insert apertures 31 of the retainer plate 28 and mold insert apertures 33 of the carrier plate 26.

The carrier plate 26 is sandwiched between the carrier base 24 and the retainer plate 28. The carrier plate 26 carries the mold inserts 30 during the casting process. The retainer plate 28 is designed to lock each of the mold inserts 30 in the carrier plate 26. The carrier base 24 is the mold assembly's 20 contact surface during conveyance through a casting system.

Figure 6:
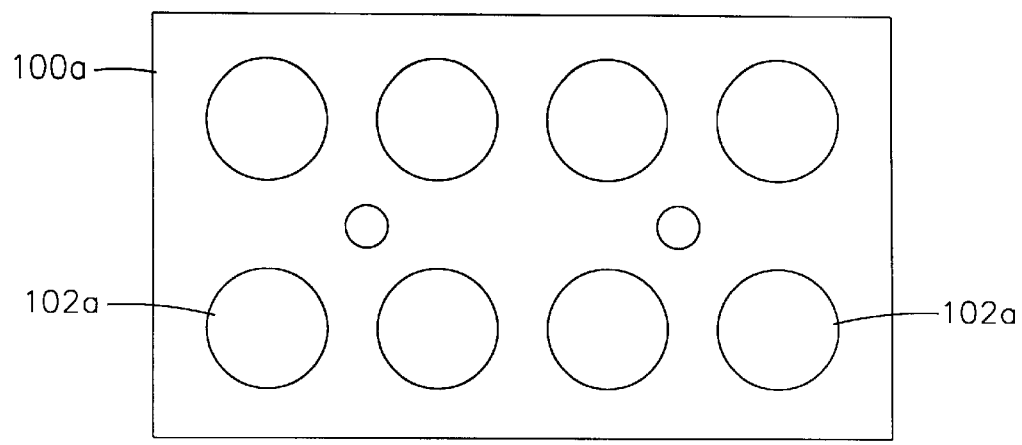
FIG. 6 is a schematic top plan view of a mold half of the prior art.
Figure 6A:
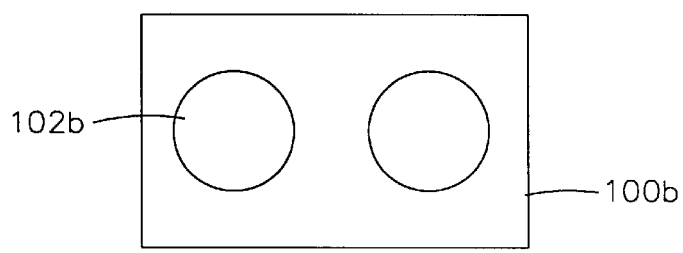
FIG. 6A is a schematic top plan view of another mold half of the prior art.
Figure 7:
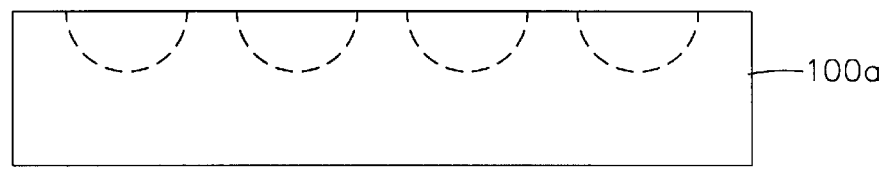
FIG. 7 is a schematic side view of the mold half of FIG. 6.

Compared to the solid one-piece body mold halves 100a–b of the prior art illustrated in FIGS. 6, 6A and 7, each mold half 22a–b of the present invention is composed of multiple stacked components that minimize the mass of the mold assembly 20 while providing sufficient structural support to withstand the high pressure forces during the casting process. The multiple component structure of each mold half 22a–b allows for a more efficient transfer of heat to the mold halves 22a–b than the prior art since there is less metal per mold cavity. Further, the mold halves 100a–b of the prior art had the cavities 102a–b as part of the body of the mold half 100a–b. The mold halves 22a–b are heated to prevent problems with the dispersion of the exothermic thermoset material into each mold cavity. Further, the mold assembly 20 is capable of casting a layer on a greater number of golf ball precursor products 25 than the prior art mold assemblies.

Figure 8:
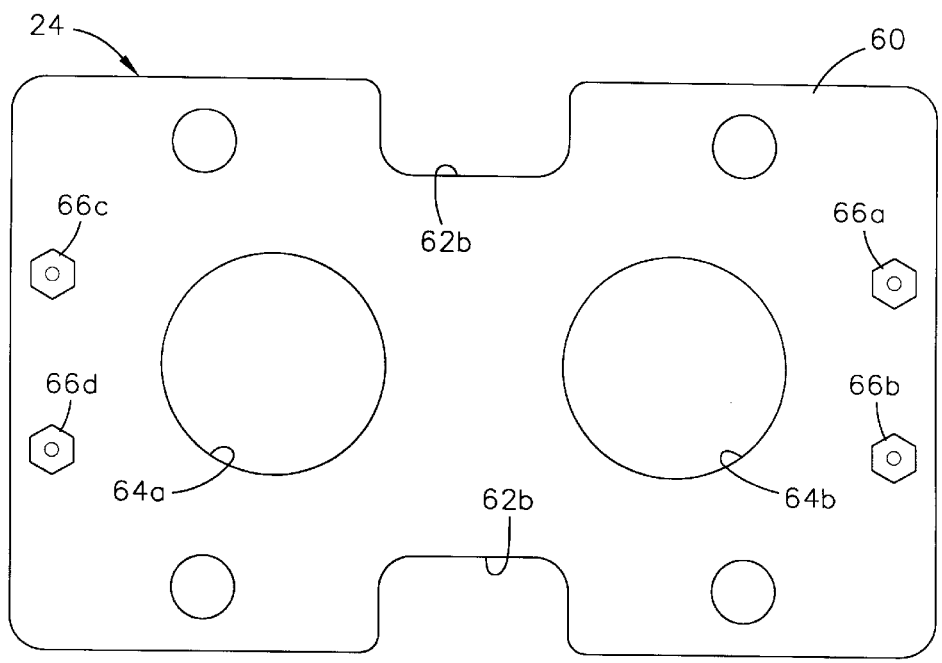
FIG. 8 is a top plan view of a carrier base of a mold half of a mold assembly of the present invention.

As shown in FIG. 8, the carrier base 24 has a substantially flat body 60 and is preferably composed of a rolled steel material. The thickness of the carrier base 24 is between 0.2 and 1.0 inches. The body 60 has two cut-outs 62a–b located in the center for stopping on a casting apparatus. The body 60 also has two hub apertures 64a–b for assembling of the mold half 22. The body 60 also has stud spacers 66a–d that elevate the carrier plate 26 approximately 1.0 inch.

Figure 9:
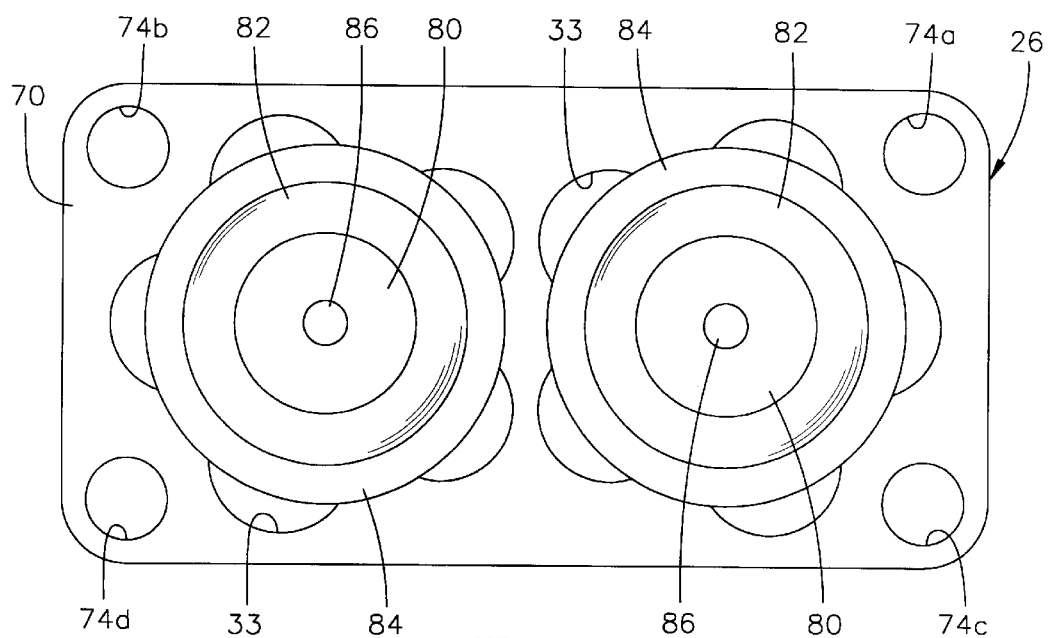
FIG. 9 is a bottom plan view of a carrier plate of a mold half of a mold assembly of the present invention.
Figure 10:
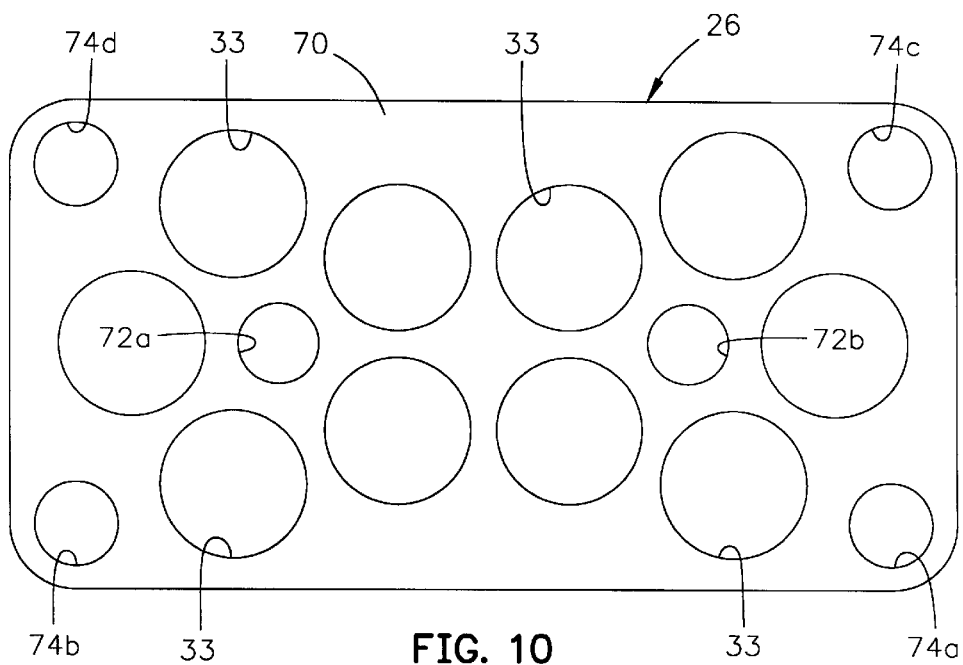
FIG. 10 is a top plan view of a carrier plate of a mold half of a mold assembly of the present invention.

As shown in FIGS. 9 and 10, the carrier plate 26 is mounted on top of the carrier base 24. The carrier plate 26 has a body 70 has a thickness that is preferably between 0.3 and 1.0 inches. The body 70 is preferably composed of a mild steel material. The body 70 has two equal sets of insert apertures 33 for housing each of the mold inserts 30. Each set of insert apertures 33 is positioned about a hub aperture 72a–b. The insert apertures 33 are equidistant from their respective hub aperture 72, and equidistant from each other within the set. Preferably, the insert apertures each have a diameter that ranges from 2.00 to 3.00 inches, and each diameter is larger than the diameter of the mold insert 30. The body 70 also has locating apertures 74a–d at each corner for mounting locating pins 92a–b and locating bushings 94a–b.

Figure 5:
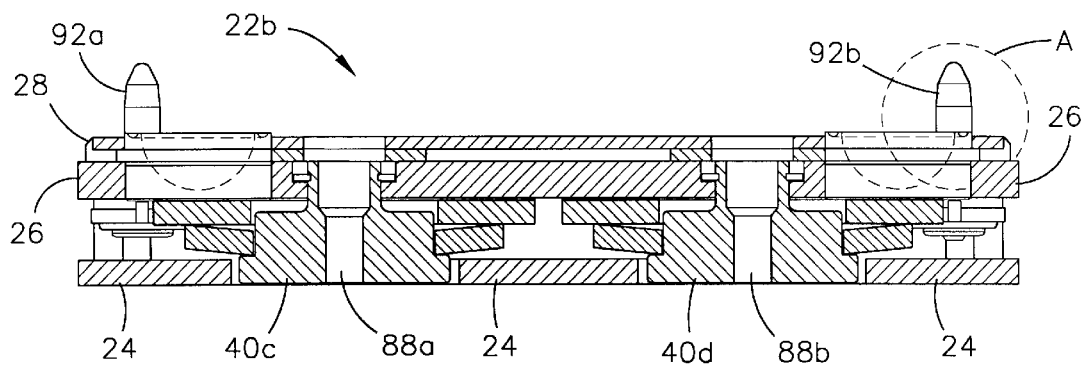
FIG. 5 is a cross-sectional view of the second mold half of FIG. 4.
Figure 5A:
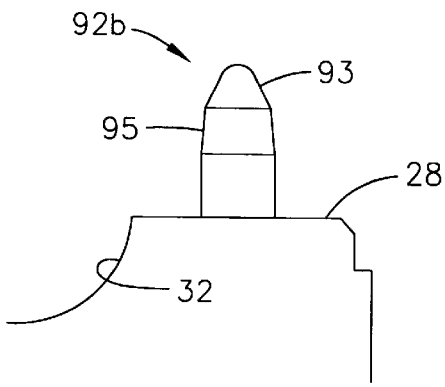
FIG. 5A is an exploded view of circle A of FIG. 5.

The locating pins 92a–b and bushings 94a–b properly align the mold halves 22a–b during mating thereof to form the mold assembly 20. In a preferred embodiment, the locating pins 92a–b are diagonally opposed to each other on the second mold half 22b. The locator bushings 94a–b are disposed on the first mold half 22a. In a preferred embodiment, as shown in FIG. 5A, the locating pin 92b has a first taper 93 and a second taper 95. The first taper 93 is preferably between 2 and 30 degrees, and most preferably 15 degrees. The second taper 95 is preferably between 10 and 40 degrees, and most preferably 30 degrees. The double tapered locating pin 92b is fixed, and during separation the first mold half 22a slides over the locating pins 92a–b. As shown in FIG. 5C, each locating pin 92a–b is disposed within a corresponding locating bushing 94a–b.

Figure 5B:
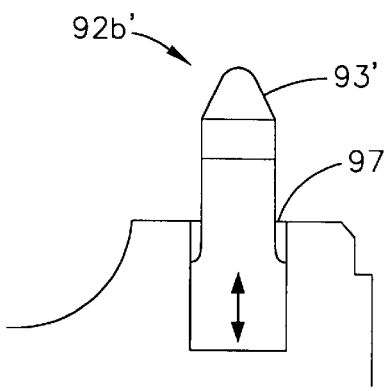
FIG. 5B is an exploded view of an alternative embodiment of the locating pin of the mold assembly of the present invention.
Figure 5C:
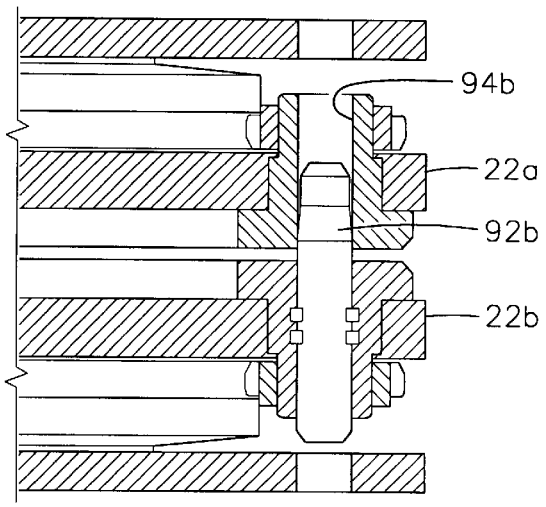
FIG. 5C is an exploded view of a locating pin engaging a locating bushing.

Alternatively, as shown in FIG. 5B, each locating pin 92a'–b' may be extended or retracted for molding and de-molding purposes from a retracting cavity 97. The top of each locating pin 92a'–b' is tapered or indented for assistance during the de-molding separation of the first and second mold halves 22a–b.

The hub mechanisms 40 are placed through the aforementioned hub apertures 72a–b on each of the mold halves 22a–b. Each hub mechanism 40a–b for the first mold half 22a has a stud adapter 80, a spring 82, a backing plate 84 and a bolt 86. Each hub mechanism 40c–d for the second mold half 22b has a stud adapter 80, a spring 82, a backing plate 84 and a nut 88. When the first mold half 22a is mated with the second mold half 22b, each bolt 86 is connected with a corresponding nut 88. Preferably, the bolts 86 are threadingly connected to the nuts 88, and each bolt 86 has a spring 90 attached thereto to keep the bolt 86 extended through the carrier plate 26. Those skilled in the art will recognize that the bolts 86 may be used on the second or bottom mold half 22b and the nuts 88 on the top or first mold half 22a. Further, those skilled in the art will recognize that each mold half 22a–b may have one nut 88 and one bolt 86.

Figure 11:
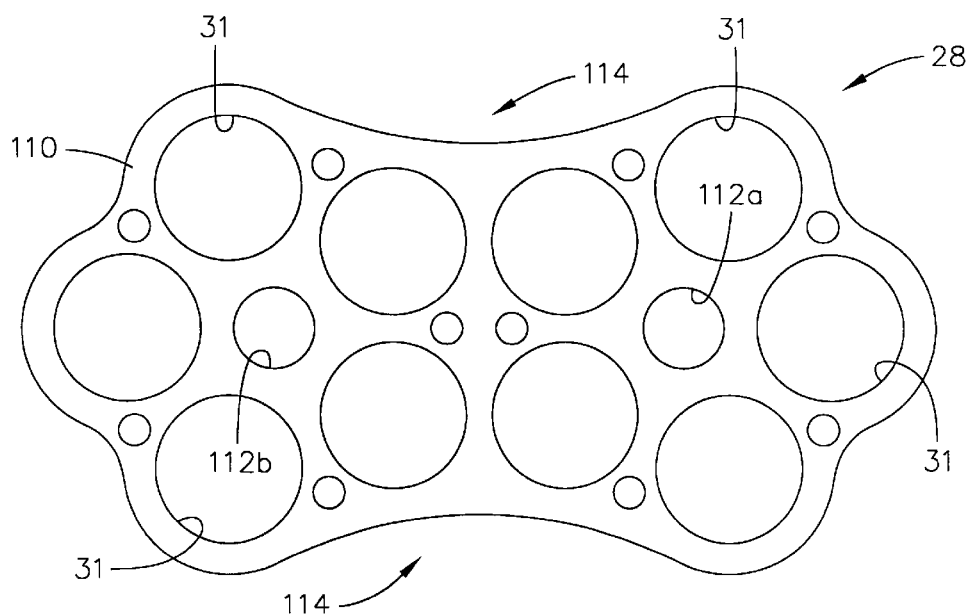
FIG. 11 is a top plan view of a retainer plate of a mold half of a mold assembly of the present invention.

As shown in FIG. 11, the retainer plate 28 has a body 110 with a curved perimeter to reduce mass. The body is preferably composed of cold-rolled steel, and preferably has a thickness between 0.1 and 0.2 inches. The retainer plate 28 is designed to secure the mold inserts 30 within the carrier plate 26 with the minimum amount of mass. The retainer plate 28 has an equal number of insert apertures 31 as the insert apertures 33 of the carrier plate 26. Further, the insert apertures 31 are smaller in diameter than the insert apertures 33 of the carrier plate 26. The retainer plate 28 also has two hub apertures 112a–b which allow for engagement of the bolts 86 with the nuts 86. Each set of insert apertures 31 is positioned about a hub aperture 112a–b. The insert apertures 31 are equidistant from their respective hub aperture 112, and equidistant from each other within the set. Preferably, each of the insert apertures 31 has a diameter that ranges from 2.00 to 3.00 inches. The retainer plate 28 is secured to the carrier plate 26 using conventional methods.

Figure 12:
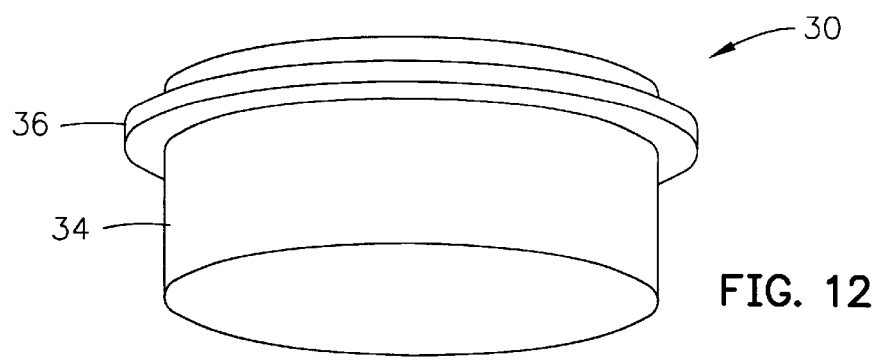
FIG. 12 is a side view of a mold insert of the mold assembly of the present invention.
Figure 13:
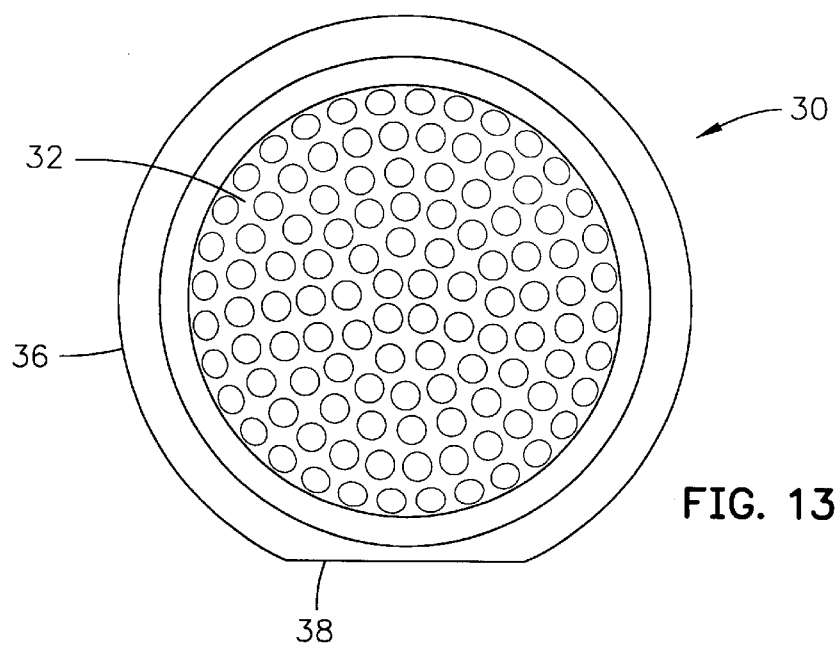
FIG. 13 is a top plan view of the mold insert of FIG. 12 illustrating the inverse dimple pattern of the cavity of the mold insert.
Figure 14:
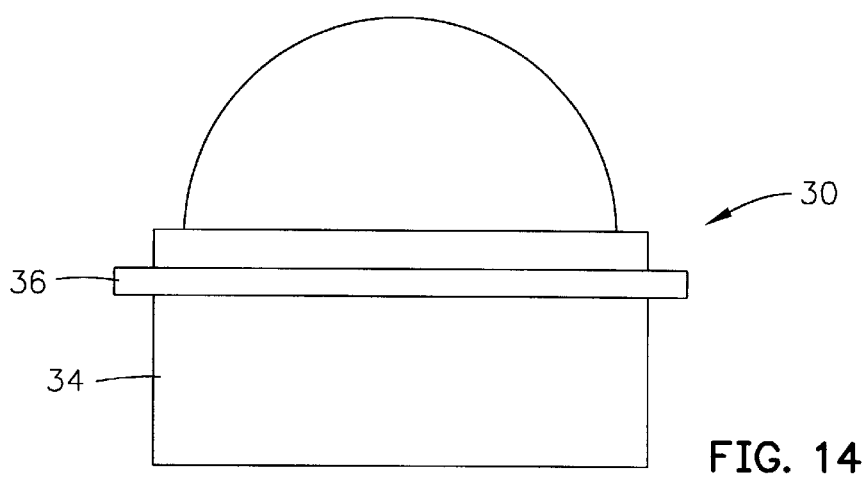
FIG. 14 is a side view of a mold insert of FIG. 12 with a golf ball precursor product therein.

FIGS. 12–14 illustrate the mold inserts 30 used with the mold assembly 20 of the present invention. Each mold insert 30 has a hemispherical cavity 32 within a body 34. Around a center height of the body 34 is an annular flange 36 that has an alignment flat 38 along a portion thereof. The flange 36 is used for mounting each mold insert 30 on the carrier plate 26.

Figure 2:
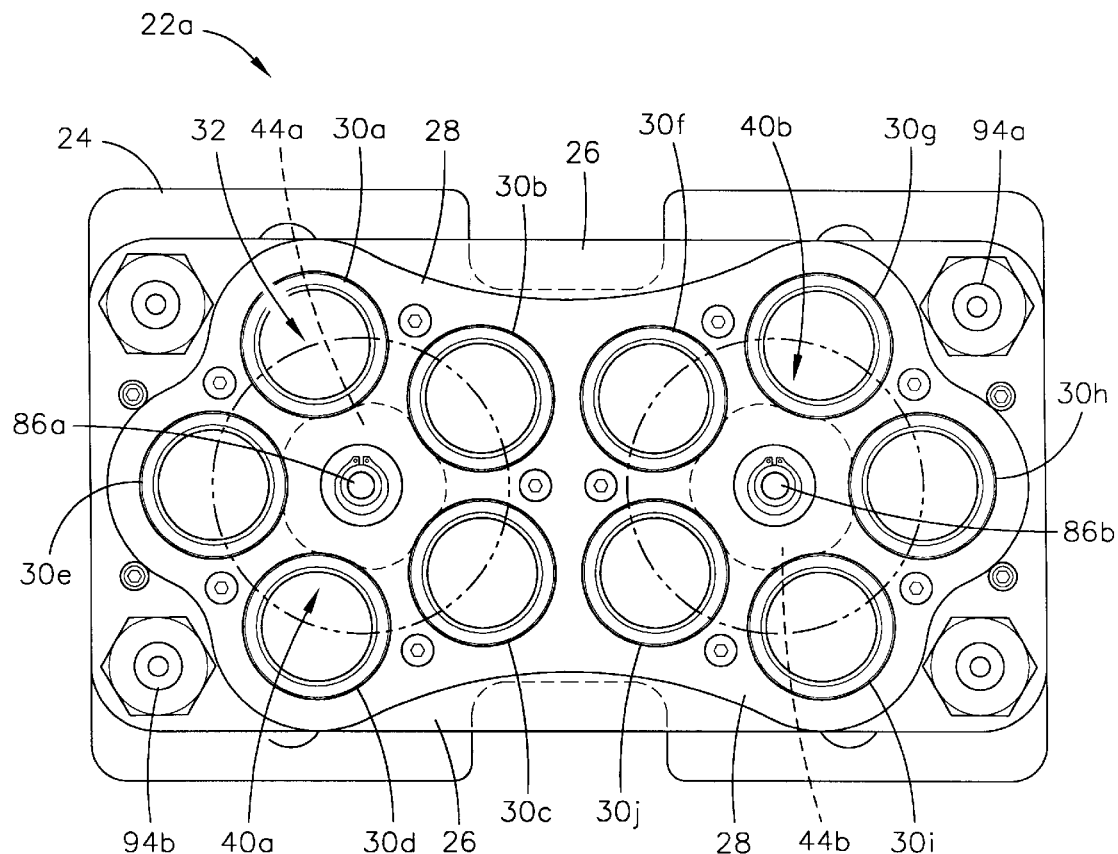
FIG. 2 is a top plan view of a first mold half of the mold assembly of FIG. 1.
Figure 3:
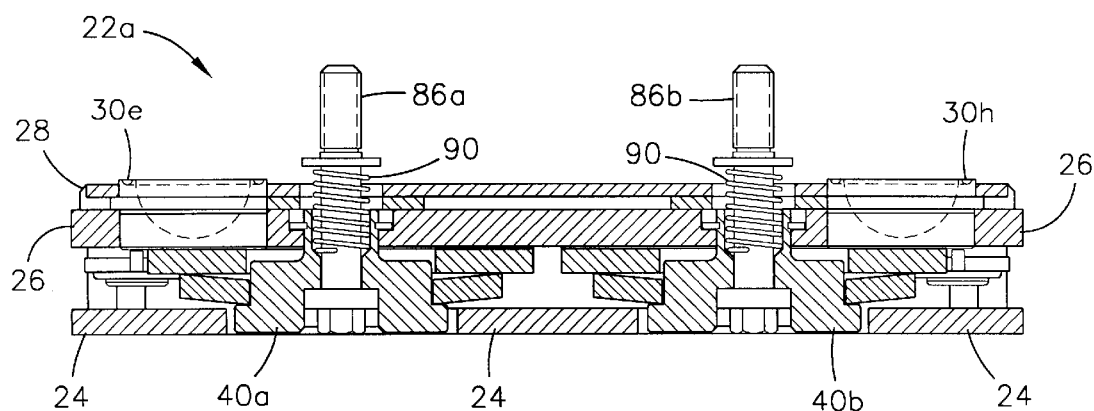
FIG. 3 is a cross-sectional view of the first mold half of FIG. 2.
Figure 4:
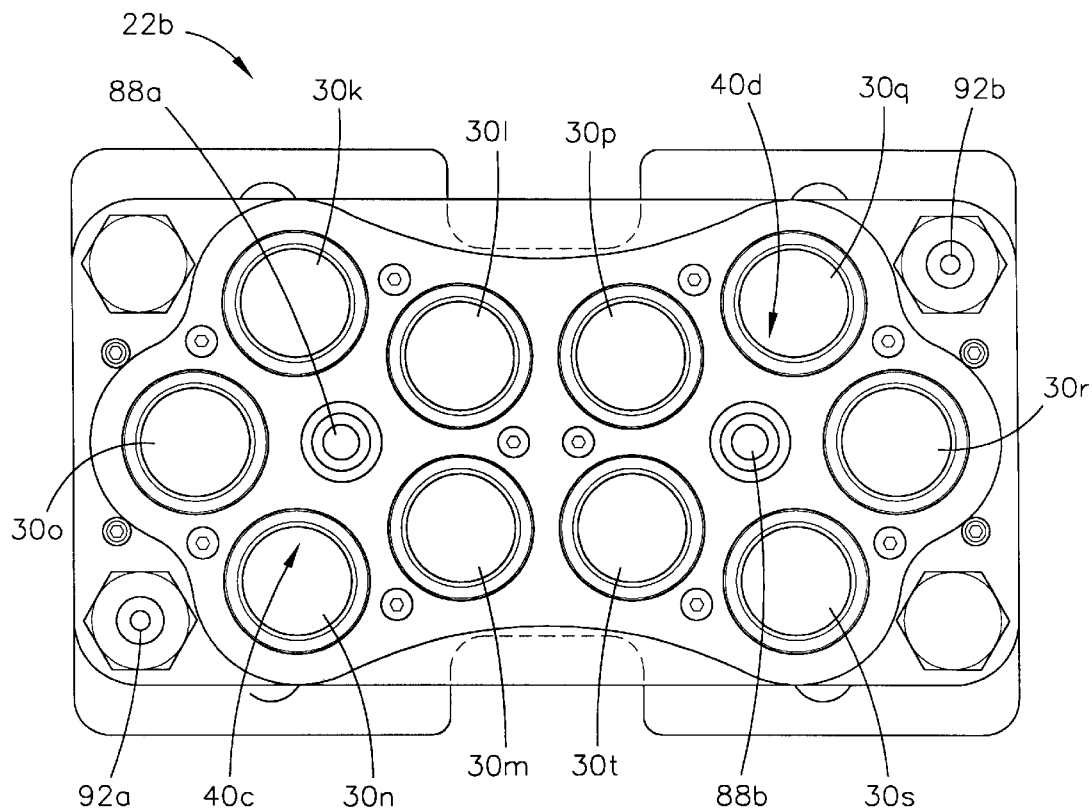
FIG. 4 is a top plan view of a second mold half of the mold assembly of FIG. 1.

The hemispherical cavity 32 preferably has an inverse dimple pattern thereon if a cover 27c is formed in the mold insert 30. However, the hemispherical cavity 32 will have a smooth surface if a boundary layer 27b is formed in the mold insert 30. The number of mold inserts 30 used for each mold half 22a–b may preferably range from eight to twelve, and is most preferably ten. In the preferred embodiment, as shown in FIGS. 2 and 4, five mold inserts 30a–e are positioned about hub mechanism 40a, five mold inserts 30f–j are position about hub mechanism 40b, five mold inserts 30k–o are positioned about hub mechanism 40c, and five mold inserts 30p–t are position about hub mechanism 40d. Those skilled in the art will recognize that more or less than five inserts may be positioned about each hub mechanism 40a–d without departing from the scope and spirit of the present invention.

Figure 15:
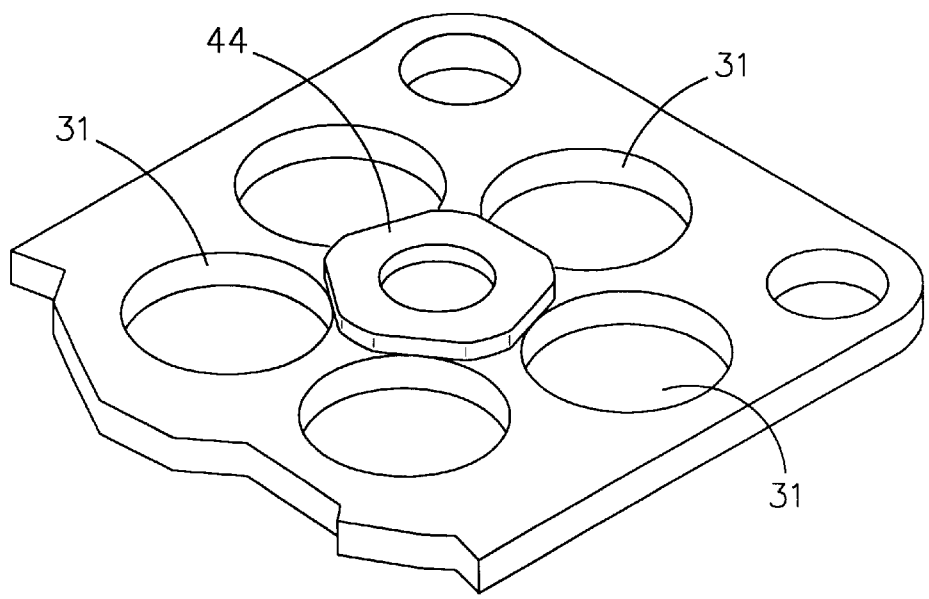
FIG. 15 is an enlarged top view of the retainer plate with an insert radial locating plate.
Figure 16:
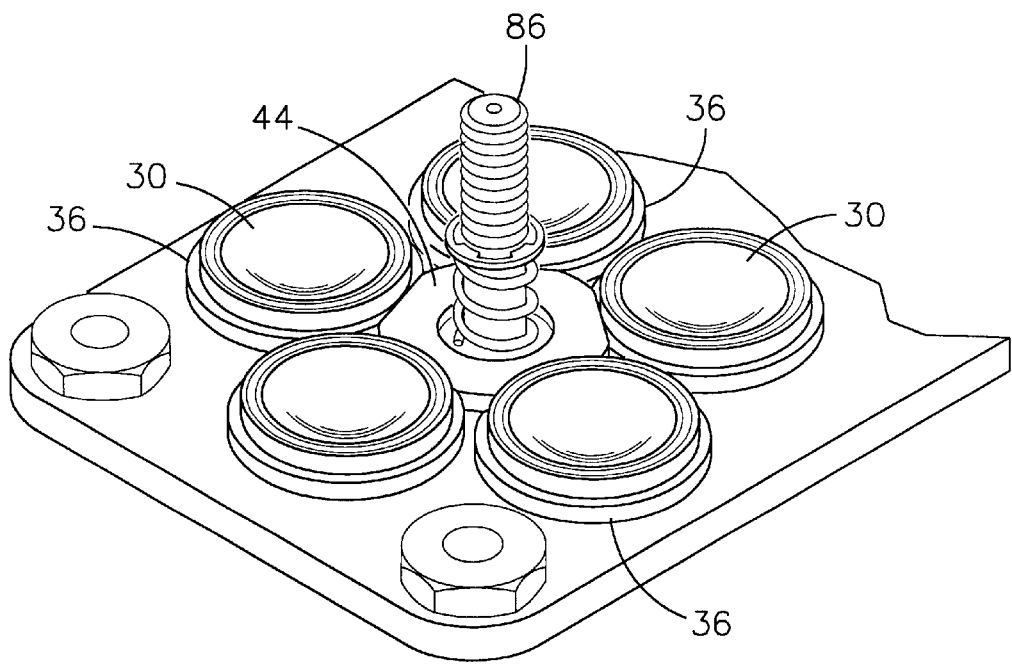
FIG. 16 is an enlarged view of a hub mechanism and mold inserts of a mold half of the mold assembly of the present invention.

As shown in FIGS. 15–16, each mold insert 30 of a set of mold inserts 30 is properly oriented using a insert radial locator plate 44 that is placed about the hub mechanism 40. Each insert radial locator plate 44a–d has straight edges to oppose the alignment flat 38 of each of the mold inserts 30. Once the locator plate 44 and the respective mold inserts 30 are aligned, the mold inserts 30 and the locator plate 44 are locked together to prevent rotation thereby ensuring that the top and bottom mold inserts 30 are oriented properly when mated, to produce the correct dimple pattern on the golf ball. Further, each mold insert may be a replaceable mold insert as set forth in co-pending U.S. patent application Ser. No. 09/310,785, entitled Replaceable Mold Inserts For Golf Balls, which pertinent parts are hereby incorporated by reference.

Figure 17:
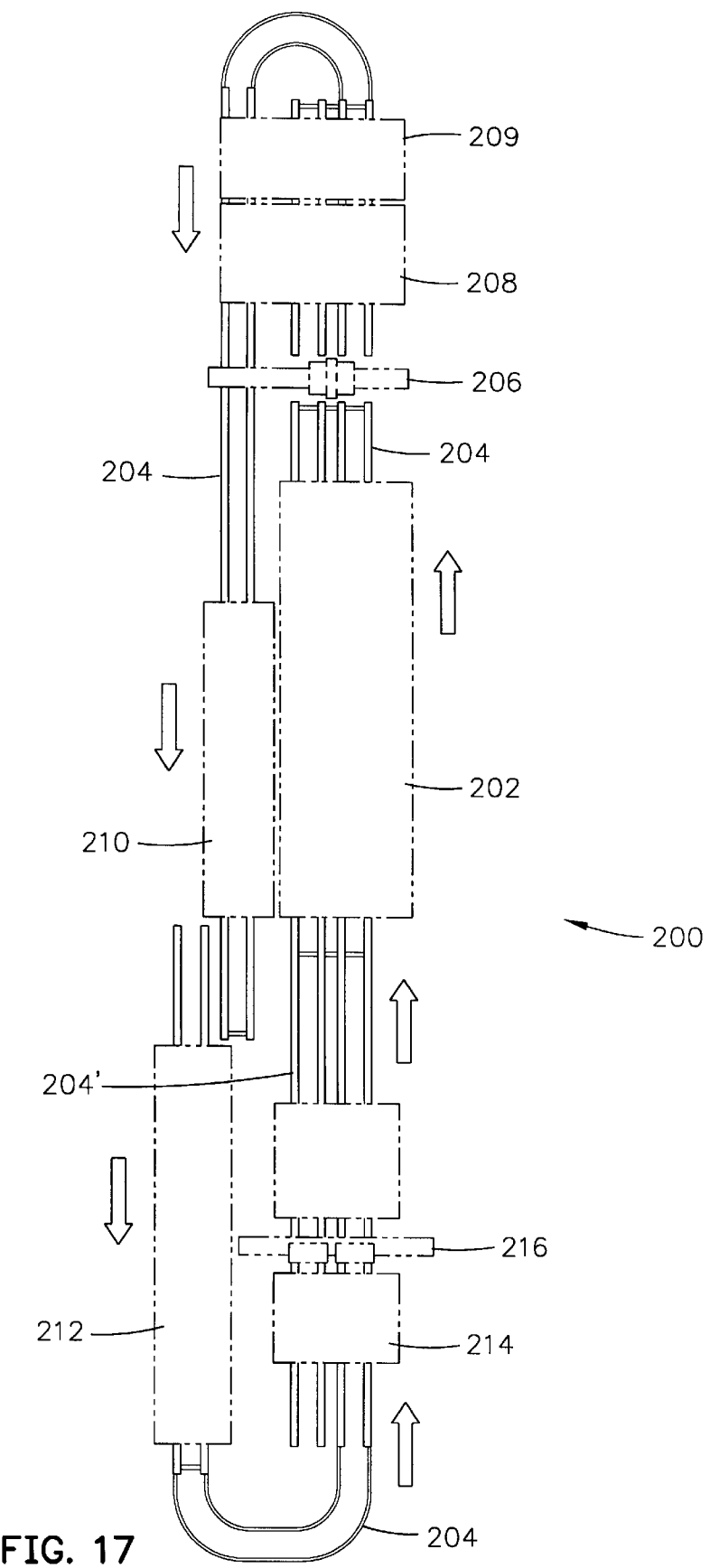
FIG. 17 is a schematic view of an overall casting system.
Figure 18:
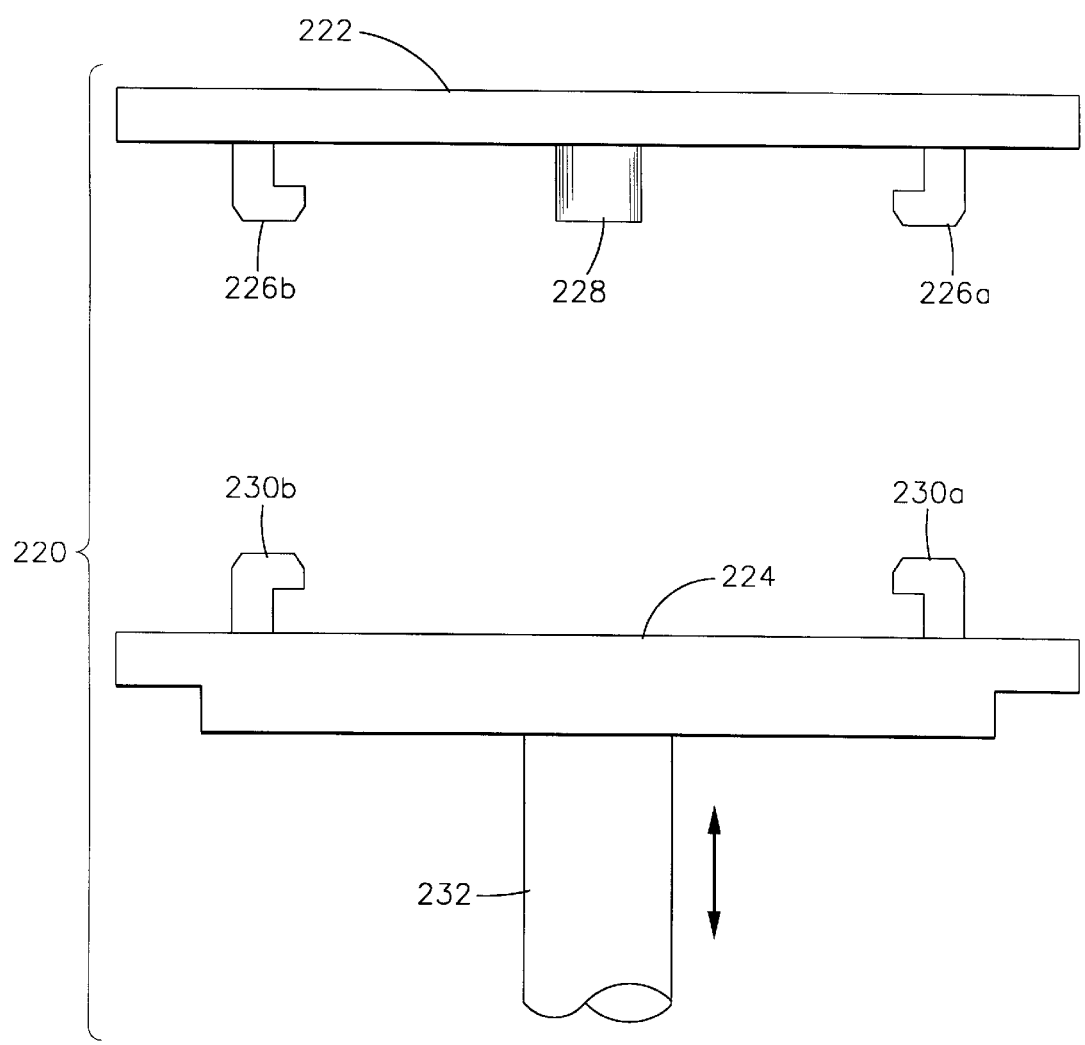
FIG. 18 is an isolated view of the mold disassembly mechanism of the present invention.
Figure 19:
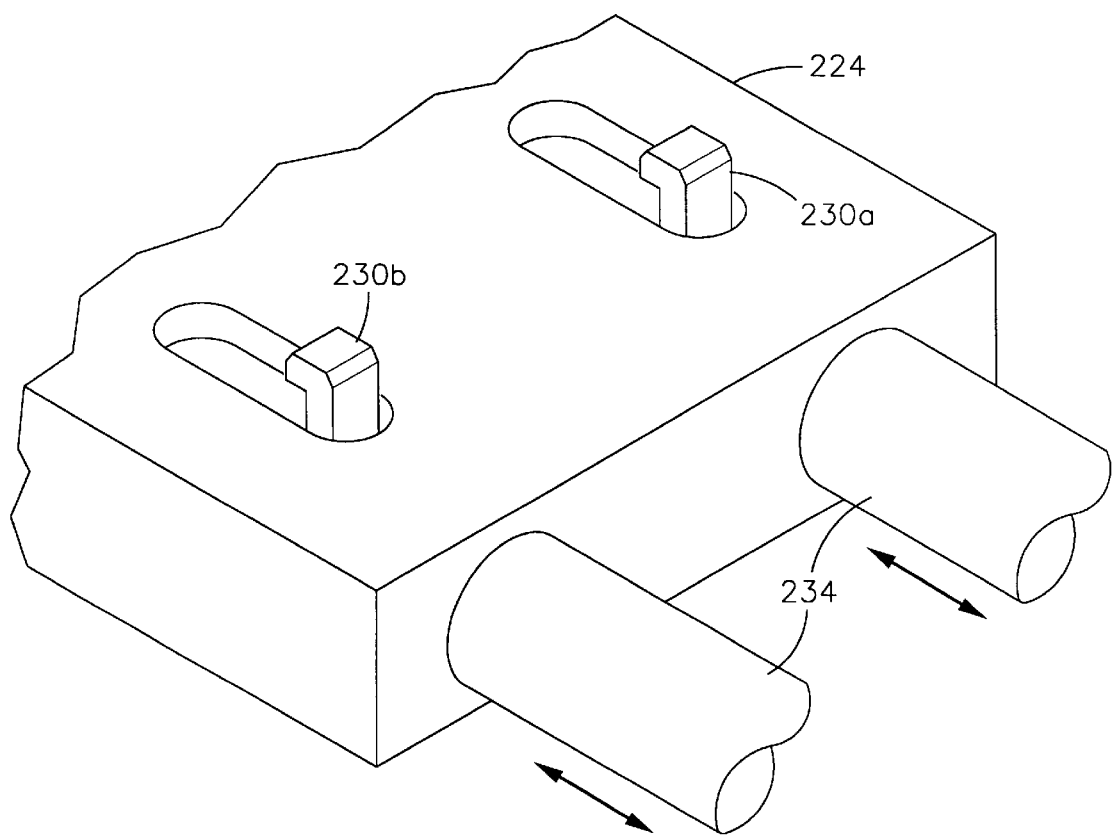
FIG. 19 is an isolated view of the bottom plate of the mold disassembly mechanism of the present invention.
Figure 20:
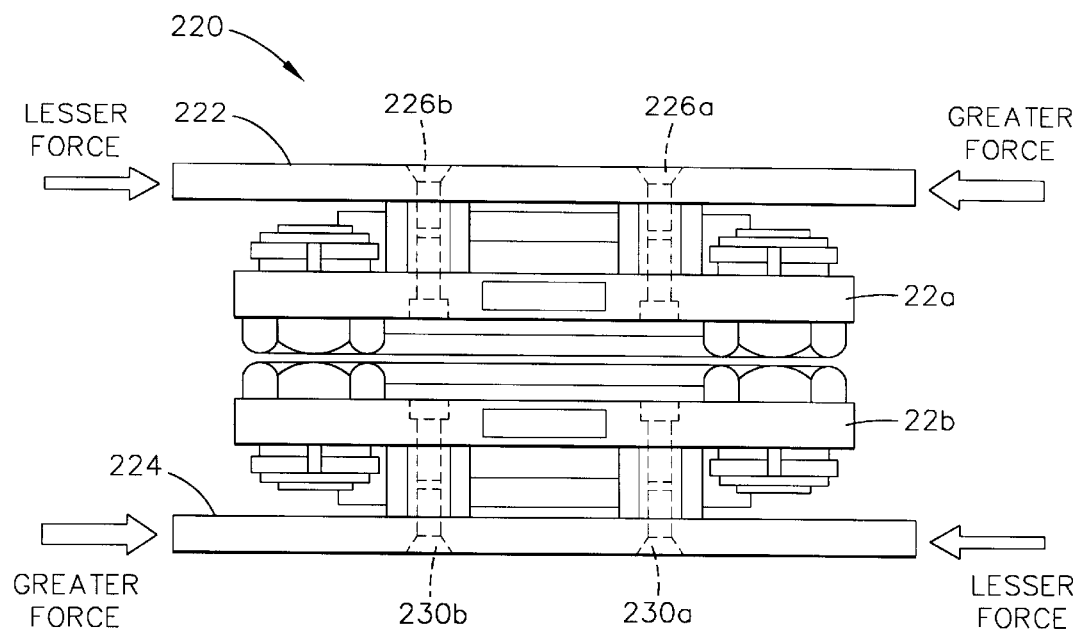
FIG. 20 is an isolated view of the mold assembly within the mold disassembly mechanism prior to separation.
Figure 21:
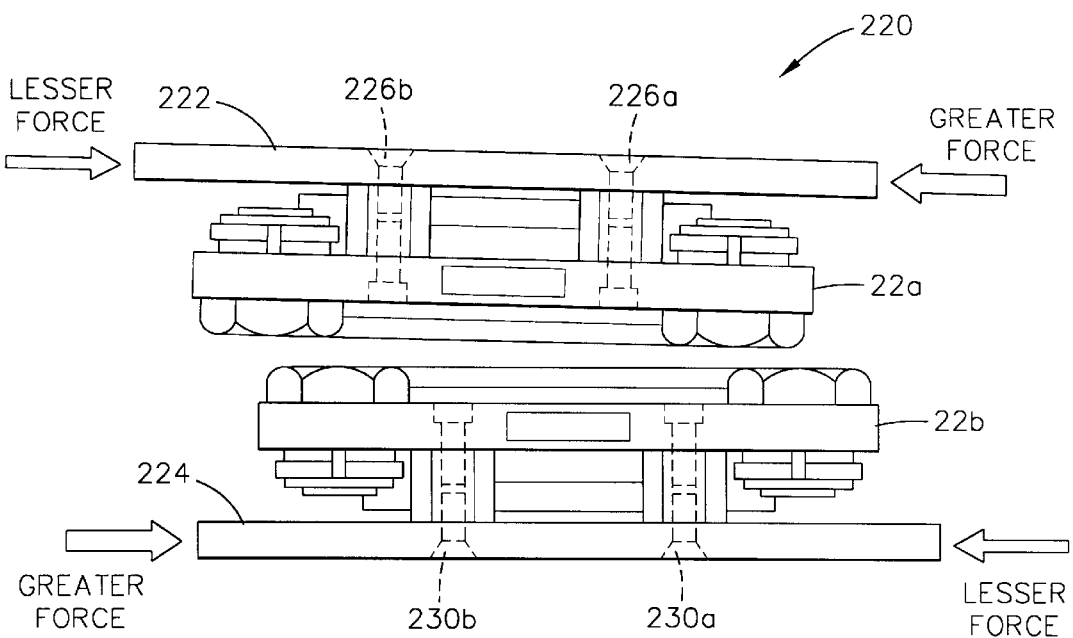
FIG. 21 is an isolated view of the mold assembly within the mold disassembly mechanism during separation.

A preferred casting system 200 is shown in FIG. 17. The mold halves 22a–b are preheated to a predetermined temperature in a preheating oven 202. From there, the mold halves 22a–b are transported on a conveyor 204 to a dispensing station 206 where each cavity 32 of each mold insert 30a–j, is filled with a flowable polyurethane mixture. The mixture is allowed to gel, or partially cure, then a golf ball precursor product 25 is inserted in each of the mold inserts 30a–j of the first mold half 22a at a core insertion station 208. During this time, the cavity 32 of the mold inserts 30k–t of the second mold half 22b,have received a predetermined quantity of the flowable polyurethane mixture. The first mold half 22a is then inverted and mated with the second mold half 22b to form the mold assembly 20 with each mold insert 30a–j of the first mold half 22a aligning with a corresponding mold insert 30k–t of the second mold half 22b. The bolts 86 are then preferably threadingly engaged with the nuts 88 at a mold assembly station 209. The mold assembly 20 is then transferred on the conveyor 204 to a curing oven 210 and then a cooling oven 212. Next, the mold assembly 20 is transferred to a disassembly station 214, and then the golf balls are removed at a removal station 216. The mold halves 22a–b are cleaned and the process is repeated. FIGS. 18 and 19 illustrate the mold disassembly mechanism 220 of the disassembly station 214. The mechanism 220 has a top plate 222 and a bottom plate 224. The top plate has at least two locking hooks 226a–b that engage the first mold half 22a. The top plate 222 also has a pair of bolt disassemblers 228 for reversing the threaded engagement of bolts 86a–b to the nuts 88a–b. The bottom plate 224 has at least two locking hooks 230a–b for engaging the second mold half 22b during de-molding. The bottom plate 224 has a pneumatic cylinder 232 for vertical movement. Both the top plate 222 and the bottom plate 224 have pneumatic cylinders 234 for lateral movement. In a preferred embodiment, the bottom plate 224 will have the pneumatic cylinders 234 on one side, and the top plate 222 will have the pneumatic cylinders on the opposite side to create a shearing effect as shown in FIGS. 20 and 21. An alternative embodiment has pneumatic cylinders 234 on both sides of the bottom plate 224 and both sides of the top plate 222 with one side having a greater lateral force than the other side for each of the plates 222 and 224.

During the disassembly operation, the mold assembly 20 enters the disassembly mechanism 220 where the hooks 230a–b of the bottom plate engage and lock with t he second mold half 22b. The bottom plate 224 with the mold assembly 20 thereon, is then lifted for engagement with the top plate 222. The hooks 226a–b of the top plate 222 engage and lock with the first mold half 22a. The bolt disassemblers 228 engage and reverse the threaded engagement of bolts 86a–b to the nuts 88a–b. The pneumatic cylinders 234 then exert a lateral force on the top plate 222 in a first direction and a lateral force on the bottom plate 224 in a second direction opposite the first direction allowing for the shearing of the mold assembly 20. A lateral force in a third direction, opposite the first direction, may also be exerted on the top plate 222, however, the lateral force in the third direction will be less than the lateral force in the first direction. Similarly, a lateral force in a fourth direction, opposite the second direction, may also be exerted on the bottom plate 224, however, the lateral force in the fourth direction will be less than the lateral force in the second direction. The shearing effect allows for the golf balls to be pinched or rolled out of the cavities 32 of the first mold half 22a while remaining in the cavities 32 of the second mold half 22b. The first mold half 22a is also angled upward due to the tapered pin 92 which may be retractable between a molding and de-molding position as shown in FIG. 5B, or may be fixed with double tapers as shown in FIG. 5A. The angle of the tapered pin angles the cavities 32 of the first mold half 22a relative to the cavities 32 of the second mold half 22b allowing for the rolling of the golf balls from the cavities 32 of the first mold half 22a.

After the de-molding of the golf balls from the first mold half 22b, the bottom plate 224 is lowered with the second mold half 22b thereon which is then conveyed to the ball removal station 216. The first mold half 22a remains engaged with the top plate 222 until a grip mechanism, not shown, engages the first mold half 22b and removes it to a second conveyance line 204'. The de-molding system of the present invention allows for the golf balls to be removed while they are still relatively hot, allowing for reduced production time.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method for de-molding a golf ball from a casting mold, the method comprising:
   providing a thermoset layer over a golf ball precursor product within a mold cavity of a mold assembly, the mold assembly divisible into first and second mold halves;
   curing the thermoset layer within the mold cavity to form a golf ball with a cured thermoset layer; and
   separating the mold assembly by exerting a first lateral force on the first mold half in a first direction, and exerting a second lateral force on the second mold half in a second direction opposite the first direction.

2. The method according to claim 1 further comprising retracting a retractable pin of the second mold half to a de-molding position prior to separating the mold assembly, the retractable pin having a tapered top portion engaging the first mold half in the de-molding position.

3. The method according to claim 1 further comprising sliding the first mold half over a double tapered fixed pin of the second mold half to separate the mold assembly.

4. The method according to claim 1 further comprising disengaging a mold assembly locking mechanism prior to separating the mold assembly.

5. The method according to claim 1 wherein separating the mold assembly further comprises exerting a third lateral force on the first mold half in a third direction opposite the first direction, the first lateral force being greater than the third lateral force, and exerting a fourth lateral force on the second mold half in a fourth direction opposite the second direction, the second lateral force being greater than the fourth lateral force.

6. The method according to claim 1 further comprising rolling the golf ball from a hemispherical cavity of the first mold half during separating the mold assembly.

7. The method according to claim 1 wherein the mold assembly has a temperature of at least 100° F. during separating the mold assembly.

8. The method according to claim 1 wherein the mold cavity is angled between 2 to 25 degrees relative to a line of conveyance during separating the mold assembly.

9. The method according to claim 1 wherein the thermoset layer is a thermoset polyurethane cover, and the golf ball precursor product is a core with a boundary layer.

10. A method for de-molding a plurality of golf balls from a casting mold, the method comprising:
    placing a thermoset cover over each of a plurality of golf ball precursor products disposed within individual mold cavities of a mold assembly, the mold assembly divisible into first and second mold halves;
    curing the thermoset cover of each of the plurality of golf ball precursor products within each of the individual mold cavities to form a plurality of golf balls with cured thermoset covers;
    separating the mold assembly by exerting a first lateral force on the first mold half in a first direction, and exerting a second lateral force on the second mold half in a second direction opposite the first direction to slide the first mold half over a double tapered pin on the second mold half; and
    removing each of the plurality of thermoset covered golf balls from the first mold half while retaining each of the plurality of thermoset covered golf balls in the second mold half.

11. The method according to claim 10 wherein the mold assembly has a temperature of at least 100° F. during separating the mold assembly.

12. The method according to claim 10 wherein the mold cavity is angled between 2 to 25 degrees relative to a line of conveyance during separating the mold assembly.

13. A system for de-molding a plurality of golf ball precursor products after casting a thermoset layer on each of the golf ball precursor products, the system comprising:
    a mold assembly comprising a first mold half and a second mold half, each of the first and second mold halves having a plurality of cavities, the second mold cavity having at least one tapered pin with a tapered top portion;
    a mold assembly separation mechanism capable of exerting a first lateral force on the first mold half in a first direction, and a second lateral force on the second mold half in a second direction opposite the first direction; and a conveyor for transferring the mold assembly to the mold assembly separation mechanism;

wherein the first mold half slides over the tapered pin in a de-molding position when the mold assembly separation mechanism exerts the first and second lateral forces against the first and second mold halves respectively.

14. The system according to claim 13 wherein the first mold half separates at an angle between two to twenty degrees relative to the conveyor when the mold assembly separation mechanism exerts the first and second lateral forces against the first and second mold halves respectively.

15. The system according to claim 13 wherein the mold assembly separation mechanism comprises:

a first locking hook for engaging the first mold half;

a second locking hook for engaging the second mold half;

a first cylinder connected to the first locking hook for exerting the first lateral force against the first mold half;

a second cylinder connected to the second locking hook for exerting the second lateral force against the second mold half; and a third cylinder connected to the second locking hook for vertical movement thereof.

16. A system for de-molding a plurality of golf ball precursor products after casting a thermoset layer on each of the golf ball precursor products, the system comprising:

a mold assembly comprising a first mold half and a second mold half, each of the first and second mold halves having a plurality of cavities, the second mold half having at least one tapered pin with a tapered top portion; and means for separating the mold assembly by exerting a first lateral force on the first mold half in a first direction and exerting a second lateral force on the second mold half in a second direction.

17. The system according to claim 16 further comprising means for lowering the second mold half from the first mold half.

18. The system according to claim 16 wherein the mold assembly has a temperature of at least 100° F. during separation of the mold assembly.

19. The system according to claim 16 wherein the separation means comprises a plurality of cylinders and a plurality of hooks.

20. The system according to claim 16 further comprising means for inverting the first mold half.

* * * * *